US012174645B2

(12) United States Patent
Kou

(10) Patent No.: US 12,174,645 B2
(45) Date of Patent: Dec. 24, 2024

(54) METHOD AND APPARATUS FOR PLANNING AN OBSTACLE-FREE MEASUREMENT TRAJECTORY OF A COORDINATE MEASURING MACHINE, AND COMPUTER PROGRAM

(71) Applicant: Carl Zeiss Industrielle Messetechnik GmbH, Oberkochen (DE)

(72) Inventor: Yu Kou, Aalen (DE)

(73) Assignee: Carl Zeiss Industrielle Messetechnik GmbH, Oberkochen (DE)

( * ) Notice: Subject to any disclaimer, the term of this patent is extended or adjusted under 35 U.S.C. 154(b) by 386 days.

(21) Appl. No.: 17/148,492

(22) Filed: Jan. 13, 2021

(65) Prior Publication Data

US 2021/0216086 A1 Jul. 15, 2021

(30) Foreign Application Priority Data

Jan. 13, 2020 (DE) ...................... 10 2020 200 309.2

(51) Int. Cl.
*G05D 3/20* (2006.01)
*G01B 5/008* (2006.01)
(Continued)

(52) U.S. Cl.
CPC ............ *G05D 3/20* (2013.01); *G01B 5/008* (2013.01); *G01B 11/005* (2013.01); *G01B 21/04* (2013.01); *G05B 19/401* (2013.01)

(58) Field of Classification Search
CPC ........ G05D 3/20; G01B 5/008; G01B 11/005; G01B 21/04; Y02P 90/02; G05B 19/401; G05B 13/04; G05B 2219/32177
(Continued)

(56) References Cited

U.S. PATENT DOCUMENTS

2008/0295349 A1* 12/2008 Uhl ...................... G01B 21/047
33/503
2018/0173242 A1* 6/2018 Lalonde ............... G05D 1/0217
(Continued)

FOREIGN PATENT DOCUMENTS

DE 19805155 A1 8/1999
DE 102008013398 A1 9/2009
(Continued)

OTHER PUBLICATIONS

GOM Webinar—Optische 3D-Messtechnik im Karosseriebau—Evaluation and Reporting, Surface Comparison, https://www.youtube.com/watch?v=WTSU1nPC-S4, Nov. 8, 2028.
(Continued)

*Primary Examiner* — Paul D Lee
(74) *Attorney, Agent, or Firm* — Ewers IP Law PLLC; Falk Ewers

(57) ABSTRACT

A method and an apparatus for planning an obstacle-free measurement trajectory of a coordinate measuring machine, and a computer program are provided. An original measurement trajectory is determined, all compact obstacles along the original measurement trajectory are determined, an obstacle entrance pose on the original measurement trajectory and an obstacle exit pose on the original measurement trajectory are determined for each compact obstacle, and at least one obstacle-free alternative measurement trajectory is determined for each compact obstacle.

18 Claims, 2 Drawing Sheets

(51) Int. Cl.
  *G01B 11/00* (2006.01)
  *G01B 21/04* (2006.01)
  *G05B 19/401* (2006.01)

(58) Field of Classification Search
  USPC .......................................................... 702/168
  See application file for complete search history.

(56) References Cited

U.S. PATENT DOCUMENTS

2019/0316893 A1* 10/2019 Singh .................. G01B 21/047
2019/0351551 A1* 11/2019 Neubauer .............. B25J 9/1664
2021/0178590 A1*  6/2021 Mao ........................ B25J 9/1671
2021/0325164 A1* 10/2021 Haas .................... G01B 21/045

FOREIGN PATENT DOCUMENTS

DE    102018105709 A1   9/2018
WO      2015074841 A1   5/2015

OTHER PUBLICATIONS

Latombe, Robot Motion Planning—Abstract, Springer Verlag, 2012.
Office Action issued in German Patent Application No. DE 10 2020 200 309.2, dated Oct. 1, 2020 (from which this application claims priority), and English language translation thereof.

* cited by examiner

METHOD AND APPARATUS FOR PLANNING AN OBSTACLE-FREE MEASUREMENT TRAJECTORY OF A COORDINATE MEASURING MACHINE, AND COMPUTER PROGRAM

CROSS REFERENCE TO RELATED APPLICATIONS

This application claims priority to German patent application DE 10 2020 200 309.2, filed Jan. 13, 2020, the entire content of which is incorporated herein by reference.

TECHNICAL FIELD

The disclosure relates to a method and an apparatus for planning an obstacle-free measurement trajectory of a coordinate measuring machine, and to a computer program.

BACKGROUND

Coordinate measuring machines serve for measuring measurement or test objects, for example in order to carry out quality control. Optical and tactile measuring methods are known. Such measurement involves generating measurement points representing, e.g., surface points of the measurement object.

In order to generate measurement points, a sensor of the coordinate measuring machine is moved along a so-called measurement trajectory or scanning path, wherein the measurement points are generated during the movement along the measurement trajectory. A large plurality of methods for planning measurement trajectories exist, these methods also being known as path planning methods. What is problematic is that there may be obstacles present in the measurement volume.

Firstly, so-called mechanical or physical obstacles exist. These obstacles can result in a collision if part of the coordinate measuring machine comes into mechanical contact with the obstacle in an undesired way. This may be the case, for example, if a disturbing contour of the coordinate measuring machine comes into contact with objects located in the measurement volume.

If optical methods are employed for generating measurement points, then optical obstacles may be present. The latter can result in a beam path used for optical measurement being masked by objects located in the measurement volume, as a result of which reliable optical detection is then no longer possible.

One approach for producing obstacle-free measurement trajectories in the prior art was user-based path planning. In that case, a user in a simulation environment, with manual inputting, created a measurement trajectory that satisfied desired quality criteria. However, that method is extremely time-consuming.

Automated methods for planning an obstacle-free measurement trajectory are furthermore known. In this regard, the video retrievable at https://www.youtube.com/watch?v=WTSUInPC-S4 shows path planning in a simulation environment in which predefined measurement points are predefined by the user and in which the corresponding measurement trajectory is determined taking account of obstacles.

SUMMARY

It is an object of the disclosure to provide a method and an apparatus for planning an obstacle-free measurement trajectory of a coordinate measuring machine and a computer program which enable planning that is simple, temporally fast and requires little computational complexity, it being ensured at the same time that the measurement of the measurement object during a movement along the planned measurement trajectory is not hindered by mechanical and/or optical obstacles.

The object is achieved by a method for planning an obstacle-free measurement trajectory of a coordinate measuring machine, an apparatus for planning an obstacle-free measurement trajectory of a coordinate measuring machine, and a computer program as described herein.

The method for planning an obstacle-free measurement trajectory of a coordinate measuring machine can be a computer-implemented method, in particular, which will be explained in greater detail below. During planning, measurement points of a measurement trajectory are determined or defined, this defining being effected before actual measurement operation of the coordinate measuring machine. During measurement operation, the coordinate measuring machine, in particular a sensor of the coordinate measuring machine, is then moved in such a way that a coordinate measurement is effected at the defined measurement points.

In this case, the method can be carried out in a simulation environment, that is to say a virtual environment. Said simulation environment can be provided by a computing device, wherein the computing device can carry out the required steps of the method.

For carrying out the method, a virtual model of the coordinate measuring machine may be known. Said virtual model may be or include a kinematic model, in particular. Furthermore, the virtual model of the coordinate measuring machine may make it possible to determine the location of a disturbing contour, for example an outer contour, of the coordinate measuring machine for each configuration of the measuring machine. In this case, a configuration of the coordinate measuring machine describes or represents a stationary kinematic state of the coordinate measuring machine. If the coordinate measuring machine include, e.g., movable parts that are movable about or along at least one axis, then a configuration can describe a (rotational) location relative to said axis. If the coordinate measuring machine includes movable parts that are movable about or along a plurality of axes, then the configuration can describe the (rotational) locations relative to all of these axes.

If a configuration of the coordinate measuring machine is known, then a position and orientation (POSE) of a sensor of the coordinate measuring machine can also be determined, in particular with a so-called forward calculation on the basis of a kinematic model of the coordinate measuring machine. As a result, it is thus possible to determine a spatial location in the form of coordinates of the sensor and also an orientation, for example a probing direction, of the sensor. If the sensor is a tactile sensor having a probe ball, then a spatial location of a ball midpoint of the probe ball can be determined, for example. If the sensor is an optical sensor, then a spatial location of a reference point of the optical sensor can be determined, for example.

Conversely, a so-called backward calculation depending on a spatial location of the sensor makes it possible to determine a corresponding configuration of the coordinate measuring machine. Corresponding methods of forward and backward calculation are known to a person skilled in the art.

The location or spatial location, which can also be referred to as pose, is a position and/or an orientation in a coordinate system, in particular in a reference coordinate system of the simulation environment. The virtual model can in particular be a computer-aided design (CAD) model of the coordinate measuring machine or be based on a CAD model of the coordinate measuring machine.

Furthermore, for carrying out the method, virtual models of objects arranged in the measurement volume, in particular of the measurement object and/or of at least one further foreign object that is different than the measurement object, and also their location in the reference coordinate system may be known. These, too, may be CAD-based. In particular, these virtual models of the further objects make it possible to determine the location of a disturbing contour, for example an outer contour, of these further objects in the measurement volume.

The method for planning the obstacle-free measurement trajectory makes it possible in particular to determine poses of the sensor which lie on the measurement trajectory and are then to be set sequentially during measurement operation with a corresponding movement of the coordinate measuring machine. Furthermore, in the method for planning, it is also possible to define movement parameters such as a velocity and/or an acceleration or the profiles thereof during the movement along the measurement trajectory.

An original measurement trajectory is determined in the method provided. Said original measurement trajectory can include a plurality of sensor poses or be defined by a plurality of sensor poses, each sensor pose defining a pose of the sensor.

It is possible for the original trajectory to be determined by a plurality of measurement points being defined and corresponding poses of the sensor being determined for these measurement points. A segment of the original measurement trajectory can be arranged between two sensor poses that are adjacent along the measurement trajectory and are defined in this way. Intermediate poses on the measurement trajectory, that is to say sensor poses in such a segment, can be determined by methods known to the person skilled in the art, e.g., interpolation methods.

The original measurement trajectory can be a measurement trajectory planned in a non-obstacle-free fashion. This can mean, in particular, that the original trajectory is planned without taking account of obstacles. In other words, the original measurement trajectory can be planned under the assumption that no collisions occur, in particular under the assumption that no foreign objects are arranged in the measurement volume. By way of example, it is thus possible to carry out methods for planning an optimum measurement trajectory for measuring a measurement object in order to determine the original measurement trajectory. Such methods are known to the person skilled in the art; by way of example, they are provided in the context of the execution of the Zeiss Caligo Universal measurement software from Carl Zeiss Industrielle Messtechnik GmbH.

The original measurement trajectory can be determined, e.g., in such a way that a measurement value quality optimized with regard to at least one criterion and/or a maximum coverage of the object to be measured are/is ensured.

In particular, it is possible for the original measurement trajectory also to be planned in the simulation environment explained above, in which case, however, only the model of the coordinate measuring machine and the model of the measurement object or else a model of the region to be measured of the measurement object (and hence not of the entire measurement object), but not models of foreign objects in the measurement volume are taken into account during the planning. If only the model of the region to be measured of the measurement object is taken into account for planning, then at least one of the remaining regions of the measurement object, i.e., regions thereof that are not to be measured, can be taken into account as foreign object for the purpose of planning the obstacle-free measurement trajectory.

In this case, the original measurement trajectory can be determined in a first step of the method.

Furthermore, all compact obstacles along the original measurement trajectory are determined in the method provided. In this case, a compact obstacle obstructs, throughout, a section between two sensor poses along the original measurement trajectory.

This can mean that none of the sensor poses of this section is obstacle-free.

Illustratively speaking, the sensor of the coordinate measuring machine will collide with an obstacle in each sensor pose of this section of the original measurement trajectory. It is important that these sensor poses are such poses which were/are defined by the original measurement trajectory. As explained above, such sensor poses can be determined, e.g., by interpolation. However, this does not preclude the fact that deviating sensor poses in which the sensor produces the same or a similar measurement result can be obstacle-free. However, these deviating sensor poses are not sensor poses on the original measurement trajectory.

In this case, all compact obstacles can be determined in a second step of the method provided.

Furthermore, an obstacle entrance pose on the original measurement trajectory and an obstacle exit pose on the original measurement trajectory are determined for each compact obstacle. In this case, an obstacle entrance pose denotes the last pose of the sensor-along and on the original measurement trajectory-which is obstacle-free, i.e., for which a collision still does not occur.

Furthermore, there may be a predetermined minimum distance between two adjacent sensor poses of the original measurement trajectory. In this case, therefore, the sensor pose that follows the obstacle entrance pose at said minimum distance along the original measurement trajectory is obstacle-containing.

Correspondingly, the obstacle exit pose denotes the first sensor pose—in the course of a progression along the original measurement trajectory—downstream of the compact obstacle which is obstacle-free. In this case, therefore, a sensor pose that lies upstream of the obstacle exit pose at a predetermined minimum distance along the original measurement trajectory can be obstacle-containing.

In this case, the obstacle entrance and obstacle exit poses on the original measurement trajectory can likewise be determined in the second step of the method.

Furthermore, in particular in a third step, at least one obstacle-free alternative measurement trajectory is determined for each compact obstacle or a check is made to determine whether such a trajectory exists for the compact obstacle. The obstacle-free alternative measurement trajectory can then form an obstacle-free replacement section or a part of such a replacement section, wherein this replacement section replaces a section of the original measurement trajectory. In this case, the replaced section can include a part of an original segment, exactly one segment, a plurality of segments or at least one segment and a part of a further segment. No collision with an obstacle occurs for the sensor poses defined by the at least one obstacle-free alternative measurement trajectory. The obstacle-free alternative measurement trajectory deviates from the original measurement trajectory; in other words, the sensor poses on the obstacle-free alternative measurement trajectory do not lie on the original measurement trajectory.

Typically, the obstacle-free alternative measurement trajectory is determined in such a way that the quality of the measurement values deviates by not more than a predetermined amount from the quality of the measurement values that is achieved during the movement along the replaced section of the original trajectory. Methods known to a person skilled in the art can be used for assessing the quality. Alternatively or cumulatively, the obstacle-free alternative measurement trajectory is determined in such a way that the coverage of the measurement object by the measurement values that is achieved by the sensor during the movement along the replacement section deviates by not more than a predetermined amount from the coverage that is achieved during the movement along the replaced section of the original trajectory.

Further alternatively or cumulatively, the obstacle-free alternative measurement trajectory is determined in such a way that the time required for moving the sensor along the entire measurement trajectory is minimized.

In this case, in a first alternative, the explained obstacle-free replacement section of the original measurement trajectory between the obstacle entrance pose and the obstacle exit pose is determined from the at least one alternative measurement trajectory if said at least one alternative measurement trajectory enables an obstacle-free connection between the obstacle entrance pose and the obstacle exit pose.

In this case, a measurement trajectory includes measurement poses, that is to say sensor poses, in which a corresponding measurement value is generated by the sensor during measurement operation. This means that the sensor poses of the obstacle-free alternative measurement trajectory also serve for generating measurement values during measurement operation.

In other words, in this first alternative, an obstacle-containing section of the original measurement trajectory is replaced by an obstacle-free, alternative measurement trajectory if such replacement is possible under the condition that meaningful measurement values continue to be generated.

In a second alternative, an obstacle-free replacement section of the original measurement trajectory between the obstacle entrance pose and the obstacle exit pose is determined from the at least one alternative measurement trajectory and at least one obstacle-free bypass trajectory, wherein the obstacle-free bypass trajectory connects the obstacle entrance or obstacle exit pose to one obstacle-free alternative measurement trajectory or two obstacle-free alternative measurement trajectories. In this regard, it is possible, for example, for an obstacle-free alternative measurement trajectory to connect the obstacle entrance pose to an intermediate pose, this intermediate pose being obstacle-free, but no obstacle-free alternative measurement trajectory for connecting the intermediate pose to the obstacle exit pose can be found. Said intermediate pose can then be connected to the obstacle exit pose via the obstacle-free bypass trajectory.

In this case, the intermediate pose denotes a sensor pose that does not lie on the original measurement trajectory. However, it is possible for the position of an intermediate pose to correspond to a position on the original measurement trajectory or for an orientation of the intermediate pose to correspond to the orientation on the original measurement trajectory. In this case, the intermediate pose can be determined in such a way that a position lies between the positions of the obstacle entrance pose and the obstacle exit pose and/or an orientation lies between the orientations of the obstacle entrance pose and the obstacle exit pose. Furthermore, the intermediate pose can be determined with an optimization method explained in even greater detail below.

Furthermore, it is possible that the obstacle entrance pose can be connected to a first intermediate pose via a first alternative obstacle-free measurement trajectory and the obstacle exit pose can be connected to a second intermediate pose via a second alternative obstacle-free measurement trajectory, a connection between the two intermediate poses via an alternative measurement trajectory not being possible. The two intermediate poses can then be connected via the bypass trajectory.

Moreover, it is possible that the obstacle exit pose can be connected to an intermediate pose via an alternative obstacle-free measurement trajectory, but it is not possible for the obstacle entrance pose to be connected to this intermediate pose via an alternative obstacle-free measurement trajectory. The intermediate pose can then be connected to the obstacle entrance pose via the bypass trajectory.

In this case, a bypass trajectory includes no measurement poses, that is to say sensor poses in which no corresponding measurement value is generated by the sensor during measurement operation. This means that the sensor poses of a bypass trajectory do not serve for generating measurement values.

In particular, measurement operation deactivation information can thus be assigned to the sensor poses along the bypass trajectory in order that during measurement operation in the course of the movement of the sensor along the measurement trajectory planned as provided, no measurement values are generated by the sensor exactly when the latter is moving along a bypass trajectory.

Correspondingly, measurement operation activation information can be assigned to sensor poses of a measurement trajectory, such that during later measurement operation in the course of a movement along a measurement trajectory, measurement values are generated by the coordinate measuring machine, in particular by the sensor.

In a third alternative, an obstacle-free replacement section of the original measurement trajectory between the obstacle entrance pose and the obstacle exit pose is determined as an obstacle-free bypass trajectory between the obstacle entrance pose and the obstacle exit pose if no obstacle-free alternative measurement trajectory exists. In particular, no intermediate poses which can be connected to the obstacle entrance pose and/or to the obstacle exit pose via an obstacle-free alternative measurement trajectory thus exist in this case.

A result of the determination of at least one obstacle-free alternative measurement trajectory here may be that no obstacle-free alternative measurement trajectory exists between the obstacle entrance pose and the obstacle exit pose. A further result may be that the obstacle entrance pose and the obstacle exit pose can be connected via an obstacle-free alternative measurement trajectory. A further result may be that the obstacle entrance pose can be connected to an intermediate pose via a first obstacle-free alternative measurement trajectory and the obstacle exit pose can be connected to a further intermediate pose via a second obstacle-free alternative measurement trajectory.

Furthermore, the section of the original measurement trajectory between the obstacle entrance pose and the obstacle exit pose which are assigned to a compact obstacle can then be replaced by the obstacle-free replacement section determined in this way.

The measurement trajectory determined in this way can thus include exclusively measurement trajectory sections or else also at least one bypass trajectory section in addition to measurement trajectory sections.

The obstacle-free measurement trajectory determined in this way can then be used for open-loop/closed-loop control of measurement operation of the coordinate measuring machine. In particular, the coordinate measuring machine can be controlled in such a way that the sensor of the coordinate measuring machine is moved along the measurement trajectory planned in this way and generates a respective measurement value in measurement poses. If the measurement trajectory determined according to the disclosure includes bypass trajectory sections, then the coordinate measuring machine can be controlled in such a way that no measurement values are generated by the sensor in sensor poses along such bypass trajectory sections.

In summary, the method consists of the following steps: generating an obstacle-containing original measurement trajectory, identifying compact obstacles, generating alternative measurement trajectory sections, generating bypass trajectories, if necessary, and generating an obstacle-free measurement trajectory.

In particular, in the third step, an alternative measurement trajectory, that is to say a trajectory having sensor poses for generating measurement values, is first sought in a local vicinity around each compact obstacle. What can advantageously be achieved as a result is that despite the blocking of the original measurement trajectory by an obstacle, the desired measurement values or as many desired measurement values as possible are also generated by the measurement trajectory determined as provided according to the disclosure. It is only if such obstacle-free alternative measurement trajectories do not exist that a local bypass path can then be generated for each compact obstacle, which bypasses the obstacle, but no measurement values are generated in said bypass path.

Overall, this advantageously results in a method for determining an obstacle-free measurement trajectory which is simple and can be carried out temporally rapidly. Said trajectory can serve for controlling measurement operation of a coordinate measuring machine. Since it is possible to use a large plurality of known methods for obstacle detection and for trajectory planning, the method can also be carried out with little computational complexity and temporally rapidly. Moreover, the highest possible quality of the measurement result generated overall is ensured.

If, for a section of the original measurement trajectory, no obstacle-free replacement section can be determined or it is possible only to determine an obstacle-free replacement section which does not satisfy predetermined criteria, e.g., with regard to the quality of the measurement values and/or the coverage and/or the time required for the movement, then the method can be terminated, with no obstacle-free measurement trajectory being determined.

In a further exemplary embodiment, the compact obstacles along the original measurement trajectory are determined by a method for recursive trajectory splitting. In other words, methods for obstacle detection for a section of the original measurement trajectory can be applied again to parts of this section if predetermined conditions are met. This applying again can be terminated if a predetermined condition is met for the section checked. This advantageously results in a reliable and temporally rapid detection or identification of compact obstacles along the original measurement trajectory.

In one exemplary embodiment, for each section of a set of sections to be checked of the original measurement trajectory, a check is made to determine whether the section is obstacle-free, wherein a check is made for each obstacle-containing section to determine whether the latter is a compact obstacle, that is to say the section entrance pose and the section exit pose satisfy the abovementioned conditions for a compact obstacle, is part of a compact obstacle, or is a non-compact obstacle, wherein further parts of the compact obstacle are determined if the section is part of a compact obstacle, or wherein the section is split into further sections to be checked if the section is a non-compact obstacle.

A section can be identified as obstacle-containing if a mechanical or optical collision with an obstacle occurs during a movement of the sensor along the original measurement trajectory. Said collision can be detected by collision detection methods known to a person skilled in the art.

At the beginning of the determination of all compact obstacles along the original measurement trajectory, that is to say at the beginning of carrying out the second step, the set of sections to be checked can contain the previously explained segments of the original measurement trajectory.

If a section is identified as a compact obstacle, then it can be removed from the set of sections to be checked. Sections can likewise be removed from the set to be checked if they are part of a compact obstacle. In this case, the sections can be added to a partial obstacle set.

The set of sections to be checked and the partial obstacle set possibly present can be stored in this case, in particular in suitable storage devices.

The checking provided advantageously results in a temporally rapid and reliable identification of compact obstacles along the original measurement trajectory.

After all sections to be checked in the set of sections to be checked have been checked, further compact obstacles can be determined depending on the sections stored in the partial obstacle set. It goes without saying that it is also possible, however, that after a section to be checked in the set of sections to be checked has been checked, a check is made to determine whether the partial obstacle set includes sections which form a compact obstacle. If this is the case, then a compact obstacle which includes these sections can be determined, the sections then being removed from the partial obstacle set.

In a further exemplary embodiment, a section is identified as a compact obstacle if a section-specific obstacle entrance pose and a section-specific obstacle exit pose are in each case obstacle-free and a path length, that is to say a distance, between the poses along the original measurement trajectory is less than or equal to a predetermined path length.

A pose can be identified as obstacle-containing if a collision with an obstacle occurs in this position and orientation of the sensor. Correspondingly, a pose can be identified as obstacle-free if no collision with an obstacle occurs in this position and orientation of the sensor. This, too, can be detected by collision detection methods known to a person skilled in the art.

In this case, the predetermined path length can be chosen depending on geometric properties of the coordinate measuring machine, in particular of the sensor. By way of example, the predetermined path length can correspond to a maximum width or a maximum diameter of the sensor or of part thereof, e.g., of a probe ball. Illustratively, this can mean that the path length is chosen in such a way that the sensor can no longer be positioned between the obstacle entrance and obstacle exit poses for generating a measurement value.

This enables a reliable identification of compact obstacles, which then serves as a basis for the further trajectory planning according to an exemplary embodiment of the disclosure.

In a further exemplary embodiment, a section is identified as part of a compact obstacle if the (section-specific) section entrance pose and/or the section-specific section exit pose are/is obstacle-containing and a path length between the points is less than or equal to the predetermined path length.

This enables a reliable identification of parts of a compact obstacle.

In a further exemplary embodiment, a section is identified as an obstacle start section if the section entrance pose is obstacle-free. Alternatively, a section is identified as an obstacle end section if the section-specific section exit pose is obstacle-free. Further alternatively, a section is identified as an obstacle intermediate section if both the section-specific section entrance pose and the section-specific section exit pose are obstacle-containing.

In other words, it is thus also possible to determine a type of an obstacle section, wherein the determination of a type simplifies a later identification of the association of such sections with compact obstacles. If such a section is stored in the partial obstacle set, then at the same time it is possible to store information about the type of the obstacle section in a manner assigned to the section.

This, too, in turn advantageously has the effect that compact obstacles can be determined temporally rapidly.

In a further exemplary embodiment, a section is identified as a non-compact obstacle if a path length between the section-specific section entrance pose and the section-specific section exit pose is greater than the predetermined path length.

This, too, advantageously results in a temporally rapid identification of compact obstacles along the original measurement trajectory.

In a further exemplary embodiment, the identification of a non-compact obstacle is followed by determining a first partial section of the section currently being checked as a further section to be checked whose section-specific section entrance pose corresponds to the previous section-specific section entrance pose and whose section-specific section exit pose corresponds to the central pose between the previous section-specific section entrance pose and the previous section-specific section exit pose. Furthermore, a second partial section of the section currently being checked is determined as a further section to be checked whose section-specific section entrance pose corresponds to the central pose between the previous section-specific section entrance pose and the previous section-specific section exit pose and whose section-specific section exit pose corresponds to the previous section-specific section exit pose. This advantageously enables the recursion to be carried out simply and temporally rapidly and thus enables the compact obstacles to be determined reliably and temporally rapidly. In this section, the central pose can denote a pose adopted by the sensor in the center of the path between the section entrance pose and the section exit pose. It can be determined with the previously explained methods for determining an intermediate pose.

In a further exemplary embodiment, an obstacle-free alternative measurement trajectory is determined with an optimization method. The optimization method can be a grid search, in particular. Parameters to be optimized can be in particular parameters in the configuration space or the poses of the sensor.

A cost function for such an optimization method can be in particular a deviation between the measurement value coverage of the original measurement trajectory or of a section thereof and the measurement value coverage achieved by the obstacle-free alternative measurement trajectory. In this case, the optimization parameters can be determined in particular in such a way that this deviation is minimal.

Alternatively or cumulatively, the cost function can include a measure of the quality of the measurement values generated by way of the obstacle-free alternative measurement trajectory, wherein this measure is intended to be as far as possible maximal.

It goes without saying that other optimization methods can also be employed as an alternative to the grid search.

If the optimization method is carried out in a multidimensional parameter space, for example in the configuration space or the pose space, then the optimization method can alter only one parameter or a plurality of parameters, but not all the parameters, of the parameter space for optimization purposes. It goes without saying, however, that it is also possible for all the parameters of the parameter space to be altered.

If the optimization takes place, e.g., in the pose space of the sensor, then it is possible to find an alternative, obstacle-free measurement trajectory whose sensor poses can deviate from those of the original, obstacle-containing measurement trajectory both in terms of position and in terms of orientation. In this case, it is thus possible for all the parameters of the pose space, that is to say position and orientation, to be altered.

This can be effected in particular in the case of an optical sensor such as a laser scanner, for example, which has a large measurement range and can thus still generate desired measurement results in the event of changes in position and also in orientation.

In the case of a tactile sensor, by contrast, it may be desirable to alter only an orientation since the measurement range is limited and a mechanical contact with the measurement object is presupposed in the course of the measurement. As a result, it may be undesirable to alter the position of the sensor, in order that the mechanical contact is still ensured.

This advantageously results in a temporally rapid and high-quality determination of an obstacle-free alternative measurement trajectory.

In a further exemplary embodiment, the method is carried out in a configuration space.

In particular, the collision detection, that is to say the identification of obstacles, can be effected in the configuration space in this case. This may necessitate transforming the sensor poses into this configuration space, which has already been explained previously. Furthermore, the determination of obstacle-free alternative measurement trajectories can also be effected in the configuration space. Bypass trajectories can also be determined in the configuration space.

This advantageously results in the fact that already known methods for trajectory planning can be used, as a result of which the provided method can be carried out temporally rapidly.

In a further exemplary embodiment, an obstacle is a physical obstacle. A physical obstacle along the trajectory leads—as explained in the introduction—to a mechanical contacting, that is to say a mechanical collision, between the coordinate measuring machine and the obstacle. This advantageously results in reliable and temporally rapid trajectory planning for coordinate measuring machines which carry out tactile methods for generating measurement values.

Alternatively or cumulatively, an obstacle is an optical obstacle. An optical obstacle here—as likewise explained in the introduction-masks or interrupts a beam path during the generation of measurement values by way of an optical sensor. In this case, in particular, a beam which is generated by the optical sensor and is radiated from the sensor to the measurement object can be masked or interrupted by the optical obstacle. Alternatively, a beam reflected from the measurement object can be masked or interrupted by the optical obstacle. The case of such interruption or masking can also be referred to as optical collision.

In summary, therefore, both mechanical and optical collisions can be avoided.

This advantageously results in reliable and temporally rapid trajectory planning for coordinate measuring machines which employ optical methods for generating measurement values.

An apparatus for planning an obstacle-free measurement trajectory of a coordinate measuring machine is furthermore provided. In this case, the apparatus includes at least one evaluation device. Said evaluation device can be embodied as a computing device, wherein a computing device can include a microcontroller or an integrated circuit or be embodied as such.

Furthermore, the apparatus can include at least one storage device for providing model data of the coordinate measuring machine and also objects in the measurement volume of the coordinate measuring machine.

In this case, a method in accordance with one of the exemplary embodiments described in this disclosure can be carried out with the provided apparatus. Consequently, the apparatus is configured in such a way that such a method can be carried out.

The apparatus can generate in particular control signals for controlling measurement operation of a coordinate measuring machine on the basis of the obstacle-free measurement trajectory planned according to an exemplary embodiment of the disclosure.

The provided planning method can be a computer-implemented method, in particular. In this regard, e.g., one or a plurality or all of the steps of the provided method can be carried out by a computer. One exemplary embodiment for the computer-implemented method for planning an obstacle-free measurement trajectory is the use of the computer for carrying out a data processing method. The computer can include, e.g., at least one computing device, in particular a processor, and, e.g., at least one storage device, in order to process the data, in particular technically, for example electronically and/or optically. A computer can in this case be any kind of data processing appliance. A processor can be a semiconductor-based processor.

A program is furthermore provided which, when executed on or by a computer or an evaluation device, causes the computer to carry out one, a plurality or all of the steps of the method for planning an obstacle-free measurement trajectory as described in this disclosure. Alternatively or cumulatively, a program storage medium or computer program product, on or in which the program is stored, in particular in a non-transitory, e.g., permanent form, is described. Alternatively or cumulatively, a computer that includes this program storage medium is described. Further alternatively or cumulatively, a signal is described, for example a digital signal, which encodes information representing the program and which includes code means adapted to carry out one, a plurality or all of the steps of the method for planning an obstacle-free measurement trajectory as described in this disclosure. The signal can be a physical signal, e.g., an electrical signal, which in particular is generated technically or by machine. The program can also cause the computer to carry out the calibration.

A method for controlling a coordinate measuring machine is likewise described, wherein control signals for the coordinate measuring machine are generated depending on or on the basis of an obstacle-free measurement trajectory, wherein the obstacle-free measurement trajectory is determined in accordance with one of the exemplary embodiments described in this disclosure.

A coordinate measuring machine including an apparatus for planning an obstacle-free measurement trajectory in accordance with one of the exemplary embodiments described in this disclosure is furthermore described.

BRIEF DESCRIPTION OF THE DRAWINGS

The disclosure will now be described with reference to the drawings wherein.

DESCRIPTION OF EXEMPLARY EMBODIMENTS

Identical reference signs hereinafter denote elements having identical or similar technical features.

Figure 1:
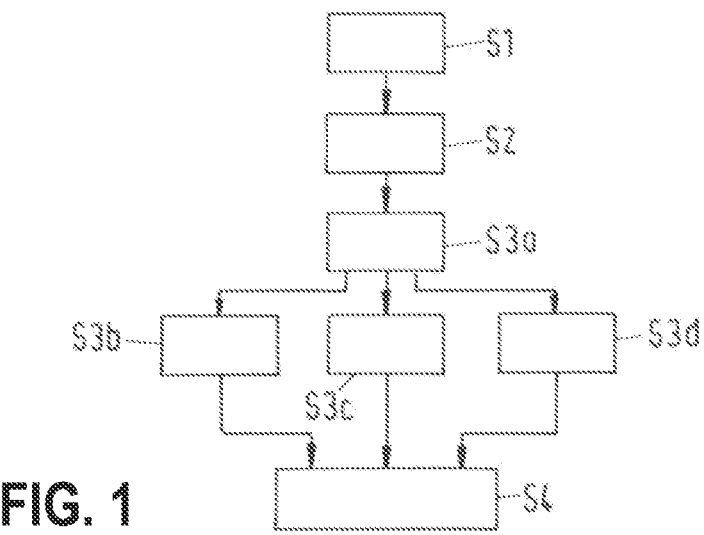
FIG. 1 shows a schematic flow diagram of a method according to an exemplary embodiment of the disclosure.
Figure 4:
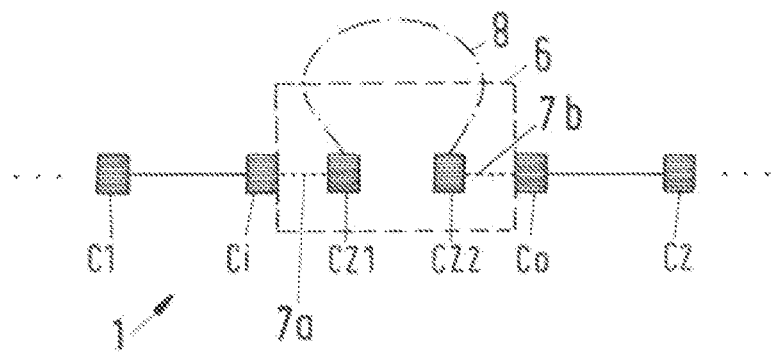
FIG. 4 shows a schematic diagram of a measurement trajectory determined according to an exemplary embodiment of the disclosure.
Figure 5:
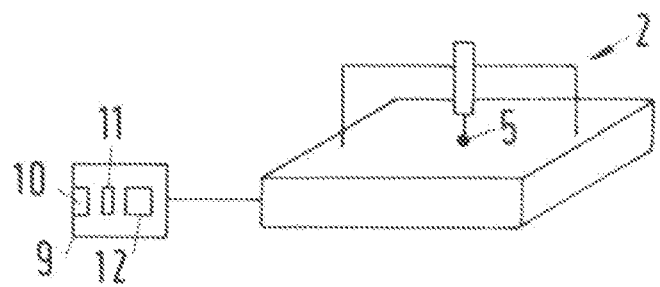
FIG. 5 shows a schematic block diagram of an apparatus including a coordinate measuring machine according to an exemplary embodiment of the disclosure.

FIG. 1 shows a schematic flow diagram of a method for planning an obstacle-free measurement trajectory 1 (see FIG. 4) of a coordinate measuring machine 2 (see FIG. 5). In a first step S1, an original measurement trajectory 3 (see FIG. 3) is determined. Said original measurement trajectory can be determined in particular without taking account of obstacles in such a way as to achieve a desired quality and/or coverage of a measurement object 4 during a measurement by the coordinate measuring machine 2 with a movement of a sensor 5 of the coordinate measuring machine along the original measurement trajectory 3 and the generation of measurement values during this movement. This original measurement trajectory 3 can be determined in a simulation environment, which has already been explained previously.

In a second step S2, all compact obstacles 6 along the original measurement trajectory 3 are determined, which will be described more specifically below in greater detail with reference to the flow diagram shown in FIG. 7.

Figure 3:
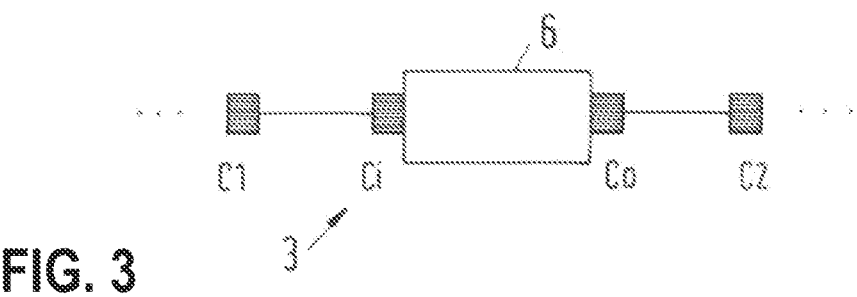
FIG. 3 shows a schematic diagram of an original measurement trajectory.

An obstacle entrance pose ci and an obstacle exit pose co on the original measurement trajectory 3 are determined for each compact obstacle 6 (see FIG. 3). This determination is likewise effected in the second step S2.

In a first substep S3a of a third step S3, the fact of whether at least one obstacle-free alternative measurement trajectory 7a, 7b (see FIG. 4) exists is then determined for each compact obstacle 6.

If the first substep S3a determines that no obstacle-free alternative measurement trajectory 7a, 7b exists between the obstacle entrance pose ci and the obstacle exit pose co of a compact obstacle 6, then an obstacle-free bypass trajectory 8 (see FIG. 4) between the obstacle entrance pose ci and the obstacle exit pose co is determined in a further substep S3b, wherein said bypass trajectory 8 then forms an obstacle-free replacement section of the original measurement trajectory 3 between the obstacle entrance pose ci and the obstacle exit pose co.

If there exists an obstacle-free connection between the obstacle entrance pose ci and the obstacle exit pose co via an obstacle-free alternative measurement trajectory 7a, 7b, then an obstacle-free replacement section of the original measurement trajectory 3 between the obstacle entrance pose ci and the obstacle exit pose co is determined as the obstacle-free alternative measurement trajectory 7a, 7b in an alternative further substep S3c.

If at least one obstacle-free alternative measurement trajectory 7a, 7b exists between the obstacle entrance pose ci and the obstacle exit pose co, yet this does not enable an obstacle-free connection of these two poses ci, co, then in a further alternative substep S3d an obstacle-free replacement section of the original measurement trajectory 3 between the obstacle entrance pose ci and the obstacle exit pose co is determined from the at least one alternative measurement trajectory 7a, 7b and at least one obstacle-free bypass trajectory 8, wherein the latter connects the obstacle entrance pose ci or the obstacle exit pose co to one obstacle-free alternative measurement trajectory 7a, 7b or two obstacle-free alternative measurement trajectories 7a, 7b.

In a fourth step S4, the section of the original measurement trajectory 3 between the obstacle entrance pose ci and the obstacle exit pose co is then replaced by the replacement sections determined in this way.

The obstacle-free measurement trajectory 1 determined in this way is then used to control the measurement operation of a coordinate measuring machine 2.

In this case, the measurement operation can be controlled in particular in such a way that measurement values are generated by the sensor 5 only during the movement along measurement trajectory sections. During a movement along a bypass trajectory 8, the coordinate measuring machine 2 can be controlled in such a way that no measurement values are generated by the sensor 5.

Figure 2:
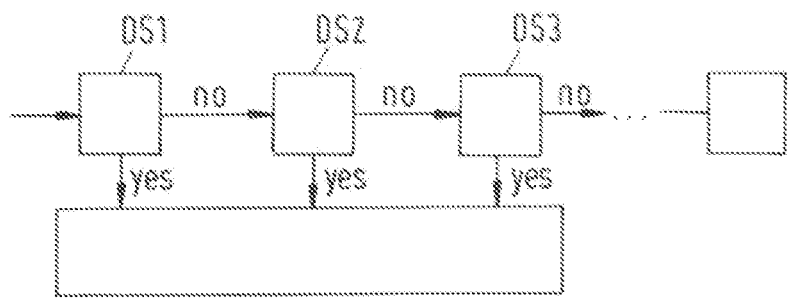
FIG. 2 shows a schematic flow diagram of obstacle detection.

FIG. 2 shows a schematic flow diagram of obstacle detection.

The method can detect, in particular, whether a sensor pose along a measurement trajectory 1, 3 is obstacle-containing or obstacle-free. In this regard, a collision with a physical obstacle can be detected in a first detection step DS1. Known collision detection methods can be used for this purpose. A collision with a physical obstacle can be determined in particular depending on geometric models of the coordinate measuring machine 2 and the foreign objects in the measurement volume. For this purpose, for example, in the corresponding sensor pose, it is possible to determine disturbing contours of the coordinate measuring machine and of the objects arranged in the measurement volume and also the location thereof in the measurement volume and to check them with regard to contact. Corresponding methods are known to a person skilled in the art.

If a corresponding collision is detected, then the corresponding sensor pose can be classified as obstacle-containing. If no such collision is detected, then in a second detection substep DS2 a check is made to determine whether an obstacle is masking or interrupting the beams which are emitted by an optical sensor in the sensor pose to be checked and which are radiated toward a measurement object 4.

This can be checked by employing methods of so-called ray tracing, which are known to a person skilled in the art. If such masking or interrupting is detected, then the corresponding sensor pose can be identified as obstacle-containing.

If no such interrupting or masking is detected, then in a third detection substep DS3 a check can be made to determine whether beams which are reflected from a measurement object 4 and which are to be received by an optical sensor for generating measurement values in the corresponding sensor pose are being masked or interrupted by an obstacle. This, too, can be established by employing the aforementioned method for ray tracing. If corresponding interrupting/masking is detected, then the sensor pose can be classified as obstacle-containing. Otherwise, further detection substeps (not illustrated) can be effected. If no physical or optical collision is detected overall, then a sensor pose can be identified as obstacle-free.

The method can correspondingly be applied to obstacle detection along a section. In this case, too, it is possible to employ methods known to a person skilled in the art for detecting physical obstacles or optical obstacles. In this regard, obstacle detection relative to a section can be effected, for example, by checking for possible or selected sensor poses along the section for their freedom from obstacles, as explained previously.

FIG. 3 shows a schematic illustration of an original measurement trajectory 3. A segment of the original measurement trajectory 3 having a segment start pose c1 and a segment end pose c2 is illustrated. These poses c1, c2 can be determined for example in the method for determining the original measurement trajectory 3 which is effected in the first step S1 (see FIG. 1).

The illustration furthermore shows a compact obstacle 6 and also an obstacle entrance pose ci and an obstacle exit pose co, which likewise lie on the original measurement trajectory 3.

With regard to the definition of a compact obstacle 6, the obstacle entrance pose ci and the obstacle exit pose co, reference is made to the previous explanations.

FIG. 4 shows a schematic diagram of a measurement trajectory 1 determined according to an exemplary embodiment of the disclosure.

The segment start pose c1 and segment end pose c2 explained with reference to FIG. 3 and also the compact obstacle 6 are illustrated. The obstacle entrance pose ci and obstacle exit pose co determined in the second step S2 are furthermore illustrated.

A first obstacle-free alternative measurement trajectory 7a, which connects the obstacle entrance pose ci to a first intermediate pose cz1, is furthermore illustrated. A second obstacle-free alternative measurement trajectory 7b, which connects a second intermediate pose cz2 to the obstacle exit pose co, is furthermore illustrated. It is assumed in the present example that no obstacle-free alternative measurement trajectory exists between the first and second intermediate poses cz1, cz2. Therefore, these points cz1, cz2 are connected via a bypass trajectory 8.

Overall, the section of the original measurement trajectory 3 between the obstacle entrance pose ci and the obstacle exit pose co is replaced by a combination of the first obstacle-free alternative measurement trajectory 7a, the bypass trajectory 8 and the second obstacle-free alternative measurement trajectory 7b.

FIG. 5 shows a schematic diagram of an apparatus 9 according to an exemplary embodiment of the disclosure for planning an obstacle-free measurement trajectory 1 for a coordinate measuring machine 2. The apparatus 9 includes an interface 10 for reading in model information appertaining to the coordinate measuring machine 2 and also foreign objects in the measurement volume. The apparatus 9 furthermore includes a storage device 11, in which said information is stored or can be stored after read-in.

The apparatus 9 furthermore includes a computing device or processor 12, which can carry out a method in accordance with one of the exemplary embodiments described in this disclosure for determining an obstacle-free measurement trajectory 1.

The illustration does not show that the apparatus 9 can include an input apparatus for an original measurement trajectory 3. Moreover, the computing device 12 illustrated can determine the original measurement trajectory 3, for example on the basis of the model information and user stipulations, which can for example likewise be input via the input apparatus not illustrated.

A coordinate measuring machine 2 of gantry design including a sensor 5 is illustrated schematically. The sensor 5 can be an optical sensor for the optical measurement of a measurement object 4. Alternatively, the sensor 5 can be a tactile sensor for the tactile measurement of the measurement object 4.

In this case, the computing device 12 can be a control device for controlling measurement operation of the coordinate measuring machine 2. By way of example, measurement operation, as explained previously, can be controlled on the basis of the measurement trajectory 1 determined according to the disclosure. In this case, for example, a movement of movable parts of the coordinate measuring machine 2 along and/or about one or more axes can be controlled in such a way that the sensor 5 is thereby positioned in desired poses along the obstacle-free measurement trajectory 1.

Figure 6:
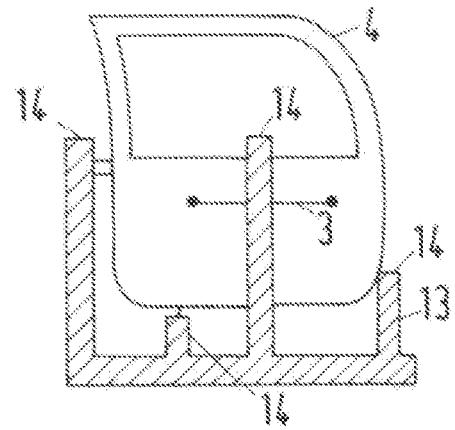
FIG. 6 shows a schematic side view of a measurement object with a holding apparatus.

FIG. 6 shows a schematic diagram of a measurement object 4 embodied as a vehicle door. In order to check a production quality, the surface of the vehicle door can be measured. In order to enable such a measurement, the vehicle door is clamped in a holding device 13, wherein said holding device can include, e.g., a plurality of columns 14. An original measurement trajectory 3 along the surface of the vehicle door is furthermore illustrated. It is evident that the original measurement trajectory 3 is blocked by a column 14 of the holding device 13. This column 14 thus forms an obstacle along the original measurement trajectory 3. An obstacle-free measurement trajectory 1 suitable for the desired measurement of the surface of the vehicle door can then be determined with the method described above.

Figure 7:
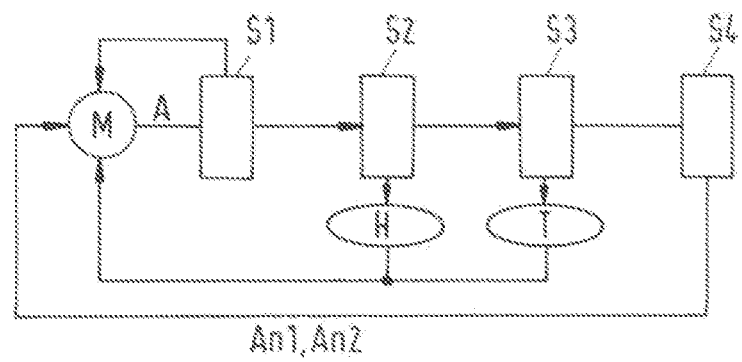
FIG. 7 shows a schematic flow diagram of a determination of compact obstacles along the original measurement trajectory.

FIG. 7 shows a schematic flow diagram of a determination of compact obstacles along the original measurement trajectory 3.

For each section A of a set M of sections A of the original measurement trajectory 3 that are to be checked, in a first step S1 a check is made to determine whether the section A is obstacle-free. For this purpose, it is possible to employ methods known to a person skilled in the art for collision detection on a section of a trajectory.

If the section A is obstacle-free, then the section A is removed from the set M and the method returns to the first step S1, wherein a new section A to be checked is checked for freedom from obstacles.

If the section A is obstacle-containing, that is to say if a physical or optical obstacle or a collision with such an obstacle is detected during a movement of the sensor 5 along the section A, then in a second step S2 a check is made to determine whether this section A is a compact obstacle. A compact obstacle is detected if two conditions are met, namely if the section entrance pose and also the section exit pose are obstacle-free and a path length between the poses is less than or equal to a predetermined path length.

If this is the case, then the section A is added to an obstacle set H and removed from the set M of sections to be checked, and the method returns to the first step S1, wherein a new section A to be checked is checked for freedom from obstacles.

If the section A is not a compact obstacle, then in a third step S3 a check is made to determine whether the section A is part of a compact obstacle.

In this regard, the section A can be identified as an obstacle start section if the section entrance pose is obstacle-free and the section exit pose is obstacle-containing and a path length between the poses is less than or equal to a predetermined path length.

Alternatively, the section A can be identified as an obstacle end section if the section exit pose is obstacle-free and the section entrance pose is obstacle-containing and the path length between the poses is less than or equal to a predetermined path length.

As a further alternative, the section A can be identified as an obstacle intermediate section if both the section entrance pose and the section exit pose are obstacle-containing and the path length between the poses is less than or equal to a predetermined path length.

If the section A was identified as an obstacle start section, an obstacle end section or as an obstacle intermediate section, then the section A is added to a partial obstacle set T and removed from the set M of sections A to be checked, and the method returns to the first step S1, wherein a new section A to be checked is checked for freedom from obstacles. In this case, the adding to the partial object set T can be effected in such a way that the information including the information about the corresponding type, that is to say the information as to whether the section A is an obstacle start section, obstacle end section or obstacle intermediate section, is assigned to the section A.

If the third step S3 detects that the section A is not part of a compact obstacle, then a fourth step S4 detects that the section A is a non-compact obstacle. In particular, in the fourth step S4 it can be assumed that the path length is greater than the predetermined path length.

Furthermore, in the fourth step S4, a first partial section An1 is determined as a further section A to be checked whose section entrance pose corresponds to the previous section entrance pose and whose section exit pose corresponds to the central pose between the previous section entrance pose and the previous section exit pose. Likewise, a second partial section An2 is determined as a further section to be checked whose section entrance pose corresponds to the central pose between the previous section entrance pose and the previous section exit pose and whose section exit pose corresponds to the previous section exit pose. These partial sections An1, An2 are added to the set M of sections A to be checked, the previous section A to be checked is removed from the set M and the method returns to the first step S1, wherein a new section A to be checked is checked for freedom from obstacles.

If the set M is empty, then the obstacles of the partial obstacle set T can be checked for correlation. In particular, it is possible to check whether a section exit pose of an obstacle start section corresponds to a section entrance pose of an obstacle intermediate section of the partial obstacle set. If this is the case, then these can be combined into a new obstacle start section. If this is not the case, then it is possible to check whether the section exit pose of the obstacle start section corresponds to a section entrance pose of an obstacle end section of the partial obstacle set. If this is the case, then these can be combined into a compact obstacle and be added to the obstacle set H.

As an alternative to checking the obstacles of the partial obstacle set T for correlation if the set M is empty, the obstacles of the partial obstacle set T can be checked for correlation after each checking of a section of the set M. A storage requirement of the partial obstacle set T can thereby be reduced.

Theoretically, the case exists where the set M is empty and the partial obstacle set T is not empty, in particular in the case in which the original measurement trajectory 3 consists only of one section, the path length of which is less than or equal to a predetermined path length. In this case, the method can be terminated, and no obstacle-free measurement trajectory 1 can be determined.

At the beginning of the illustrated determination of all compact obstacles along the original measurement trajectory 3, the set M of sections A to be checked can contain the previously explained segments of the original measurement trajectory.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 Obstacle-free measurement trajectory
2 Coordinate measuring machine
3 Original measurement trajectory
4 Measurement object, vehicle door
5 Sensor
6 Compact obstacle
7a First obstacle-free alternative measurement trajectory
7b Second obstacle-free alternative measurement trajectory
8 Bypass trajectory
9 Apparatus
10 Interface
11 Storage device
12 Computing device
13 Holding device
14 Column
S1 First step
S2 Second step
S3 Third step
S4 Fourth step
S3a First alternative step
S3b Second alternative step
S3c Third alternative step
S3d Fourth alternative step
S4 Fourth step
DS1 First detection substep
DS2 Second detection substep
DS3 Third detection substep
c1 Segment start point
c2 Segment end point
ci Obstacle entrance pose
co Obstacle exit pose
cz1 First intermediate pose
cz2 Second intermediate pose

What is claimed is:

1. A method for controlling a coordinate measuring machine according to an obstacle-free measurement trajectory, the method comprising:
determining an original measurement trajectory;
determining all compact obstacles along the original measurement trajectory;
determining an obstacle entrance pose on the original measurement trajectory and an obstacle exit pose on the original measurement trajectory for each compact obstacle; and
when an obstacle-free alternative measurement trajectory between the obstacle entrance pose and the obstacle exit pose exists, determining at least one obstacle-free alternative measurement trajectory for each compact obstacle, by:
determining a first obstacle-free replacement section of the original measurement trajectory between the obstacle entrance pose and the obstacle exit pose from the at least one obstacle-free alternative measurement trajectory between the obstacle entrance pose and the obstacle exit pose when the at least one obstacle-free alternative measurement trajectory enables an obstacle-free connection between the obstacle entrance pose and the obstacle exit pose, or
determining a second obstacle-free replacement section of the original measurement trajectory between the obstacle entrance pose and the obstacle exit pose from the at least one obstacle-free alternative measurement trajectory and at least one first obstacle-free bypass trajectory, wherein the at least one first obstacle-free bypass trajectory connects the obstacle entrance pose or the obstacle exit pose to the at least one obstacle-free alternative measurement trajectory or to two of the at least one obstacle-free alternative measurement trajectory;
when no obstacle-free alternative measurement trajectory between the obstacle entrance pose and the obstacle exit pose exists, determining a third obstacle-free replacement section of the original measurement trajectory between the obstacle entrance pose and the obstacle exit pose as at least one second obstacle-free bypass trajectory between the obstacle entrance pose and the obstacle exit pose; and
controlling the coordinate measuring machine based on the obstacle-free measurement trajectory resulting from the original measurement trajectory in which a section between the obstacle entrance pose and the obstacle exit pose is replaced by an obstacle-free replacement section.

2. The method as according to claim 1, wherein the compact obstacles along the original measurement trajectory are determined by a method for recursive trajectory splitting.

3. The method according to claim 2, wherein for each section of a set of sections of the original measurement trajectory to be checked, a check is made to determine whether the section is obstacle-free,
wherein the check is made for each obstacle-containing section to determine whether the obstacle-containing section:

is the compact obstacle,
is part of the compact obstacle, or
is a non-compact obstacle,
wherein further parts of the compact obstacle are determined when the section is part of the compact obstacle, and
wherein the section is split into further sections to be checked if the section is the non-compact obstacle.

4. The method according to claim 3, further comprising:
identifying the section as the compact obstacle when a section entrance pose and a section exit pose are each obstacle-free and a path length between the section entrance pose and the section exit pose is less than or equal to a predetermined path length.

5. The method according to in claim 3, further comprising:
identifying the section as part of the compact obstacle when a section entrance pose and/or a section exit pose are/is obstacle-containing and a path length between the section entrance pose and a section exit pose is less than or equal to a predetermined path length.

6. The method according to claim 5, wherein
the section is identified as an obstacle start section when the section entrance pose is obstacle-free, or
wherein the section is identified as an obstacle end section when the section exit pose is obstacle-free, or
wherein the section is identified as an intermediate obstacle section when both the section entrance pose and the section exit pose are obstacle-containing.

7. The method according to claim 3, further comprising:
identifying the section as the non-compact obstacle when a path length between a section entrance pose and a section exit pose is larger than a predetermined path length.

8. The method according to claim 3, wherein an identification of the non-compact obstacle is followed by:
determining a first partial section as a further section to be checked whose section entrance pose corresponds to a previous section entrance pose and whose section exit pose corresponds to an intermediate pose between the previous section entrance pose and a previous section exit pose, and
determining a second partial section as a further section to be checked whose section entrance pose corresponds to the intermediate pose between the previous section entrance pose and the previous section exit pose and whose section exit pose corresponds to the previous section exit pose.

9. The method according to claim 1, wherein the obstacle-free alternative measurement trajectory is determined with an optimization method.

10. The method according to claim 1, wherein the method is carried out in a configuration space.

11. The method according to claim 1, wherein an obstacle is a physical obstacle.

12. The method according to claim 1, wherein an obstacle is an optical obstacle.

13. The method according to claim 12, wherein the optical obstacle is formed by masking of an emitted beam or by the masking of a reflected beam.

14. The method as according to claim 1, further comprising:
generating a control signal based on the obstacle-free measurement trajectory; and
controlling the coordinate measuring machine with the control signal.

15. An apparatus for controlling a coordinate measuring machine according to an obstacle-free measurement trajectory, the apparatus comprising:
at least one evaluation device, wherein with the at least one evaluation device:
all compact obstacles along an original measurement trajectory are determinable,
an obstacle entrance pose on the original measurement trajectory and an obstacle exit pose on the original measurement trajectory are determinable for each of the compact obstacles,
when an obstacle-free alternative measurement trajectory between the obstacle entrance pose and the obstacle exit pose exists, at least one obstacle-free alternative measurement trajectory is determinable for each of the compact obstacles, by:
determining a first obstacle-free replacement section of the original measurement trajectory between the obstacle entrance pose and the obstacle exit pose from the at least one obstacle-free alternative measurement trajectory between the obstacle entrance pose and the obstacle exit pose when the at least one obstacle-free alternative measurement trajectory enables an obstacle-free connection between the obstacle entrance pose and the obstacle exit pose, or
determining a second obstacle-free replacement section of the original measurement trajectory between the obstacle entrance pose and the obstacle exit pose from the at least one obstacle-free alternative measurement trajectory and at least one first obstacle-free bypass trajectory, wherein the at least one first obstacle-free bypass trajectory connects the obstacle entrance pose or the obstacle exit pose to the at least one obstacle-free alternative measurement trajectory or to two of the at least one obstacle-free alternative measurement trajectory,
when no obstacle-free alternative measurement trajectory between the obstacle entrance pose and the obstacle exit pose exists, determining a third obstacle-free replacement section of the original measurement trajectory between the obstacle entrance pose and the obstacle exit pose as at least one second obstacle-free bypass trajectory between the obstacle entrance pose and the obstacle exit pose when no obstacle-free alternative measurement trajectory exists; and
a controller configured to control the coordinate measuring machine based on the obstacle-free measurement trajectory resulting from the original measurement trajectory in which a section between the obstacle entrance pose and the obstacle exit pose is replaced by an obstacle-free replacement section.

16. The apparatus according to claim 15, wherein the at least one evaluation device is configured to:
generate a control signal based on the obstacle-free measurement trajectory; and
control the coordinate measuring machine with the control signal.

17. A non-transitory computer-readable storage medium on which a computer program for determining an obstacle free measurement trajectory for controlling a coordinate measuring machine according to an obstacle-free measurement trajectory is stored which, when executed on or by a computer or at least one evaluation device, causes the computer or the at least one evaluation device to carry out all of:

determining an original measurement trajectory;

determining all compact obstacles along the original measurement trajectory;

determining an obstacle entrance pose on the original measurement trajectory and an obstacle exit pose on the original measurement trajectory for each compact obstacle; and when an obstacle-free alternative measurement trajectory between the obstacle entrance pose and the obstacle exit pose exists, determining at least one obstacle-free alternative measurement trajectory for each compact obstacle, by:

determining a first obstacle-free replacement section of the original measurement trajectory between the obstacle entrance pose and the obstacle exit pose is determined from the at least one obstacle-free alternative measurement trajectory between the obstacle entrance pose and the obstacle exit pose when the at least one obstacle-free alternative measurement trajectory enables an obstacle-free connection between the obstacle entrance pose and the obstacle exit pose, or determining a second obstacle-free replacement section of the original measurement trajectory between the obstacle entrance pose and the obstacle exit pose from the at least one obstacle-free alternative measurement trajectory and at least one first obstacle-free bypass trajectory, wherein the at least one first obstacle-free bypass trajectory connects the obstacle entrance pose or the obstacle exit pose to the at least one obstacle-free alternative measurement trajectory or to two of the at least one obstacle-free alternative measurement trajectory;

when no obstacle-free alternative measurement trajectory between the obstacle entrance pose and the obstacle exit pose exists, determining a third obstacle-free replacement section of the original measurement trajectory between the obstacle entrance pose and the obstacle exit pose as at least one second obstacle-free bypass trajectory between the obstacle entrance pose and the obstacle exit pose; and controlling the coordinate measuring machine based on the obstacle-free measurement trajectory resulting from the original measurement trajectory in which a section between the obstacle entrance pose and the obstacle exit pose is replaced by an obstacle-free replacement section.

18. The non-transitory computer-readable storage medium according to claim 17, wherein the computer program, when executed on or by the computer or the at least one evaluation device, further causes the computer or the at least one evaluation device to:

generate a control signal based on the obstacle-free measurement trajectory; and control the coordinate measuring machine with the control signal.

* * * * *